United States Patent
Shen (10) Patent No.: US 10,182,139 B2
(45) Date of Patent: Jan. 15, 2019

(54) METHOD AND APPARATUS FOR CONTROLLING SMART MOBILE DEVICE

(71) Applicant: ZTE CORPORATION, Shenzhen, Guangdong (CN)

(72) Inventor: Shaowu Shen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/769,566

(22) PCT Filed: Jun. 24, 2016

(86) PCT No.: PCT/CN2016/087120
§ 371 (c)(1),
(2) Date: Apr. 19, 2018

(87) PCT Pub. No.: WO2016/198024
PCT Pub. Date: Dec. 15, 2016

(65) Prior Publication Data
US 2018/0316786 A1 Nov. 1, 2018

(30) Foreign Application Priority Data

Oct. 20, 2015 (CN) .......................... 2015 1 0685061

(51) Int. Cl.
*H04M 1/725* (2006.01)
*G06F 3/01* (2006.01)
(Continued)

(52) U.S. Cl.
CPC ......... *H04M 1/72519* (2013.01); *G06F 3/011* (2013.01); *H04B 17/30* (2015.01); *G01V 3/12* (2013.01); *H04M 2250/12* (2013.01)

(58) Field of Classification Search
CPC .......................... H04M 1/72519; G06F 3/011
See application file for complete search history.

(56) References Cited

U.S. PATENT DOCUMENTS

2006/0024647 A1 * 2/2006 Chesnais ................. G06F 3/016
434/114
2007/0010217 A1 * 1/2007 Takahashi .............. H01Q 1/245
455/121

(Continued)

FOREIGN PATENT DOCUMENTS

CN 104170265 A 11/2014

OTHER PUBLICATIONS

International Search Report and Written Opinion for PCT Appl. No. PCT/CN2016/087120, dated Oct. 9, 2016.

*Primary Examiner* — Christopher M Brandt
(74) *Attorney, Agent, or Firm* — Foley & Lardner LLP; Christopher J. McKenna; Meng H. Pua (57) ABSTRACT

A method and an apparatus for controlling a smart mobile device are disclosed. The method for controlling a smart mobile device includes: determining, when enabling a control of the smart mobile device by using body induction, a standing wave ratio (SWR) of the smart mobile device on the body induction according to a detected parameter of a body closing to the smart mobile device; and selecting a control instruction according to the determined SWR of the smart mobile device on the body induction and a preset corresponding relationship between the SWR of the smart mobile device on the body induction and the control instruction, and controlling the smart mobile device based on the selected control instruction.

18 Claims, 1 Drawing Sheet

(51) Int. Cl.
*H04B 17/30* (2015.01)
*G01V 3/12* (2006.01)

(56) References Cited

U.S. PATENT DOCUMENTS

| | | |
|---|---|---|
| 2013/0324056 A1 | 12/2013 | Maguire |
| 2014/0128032 A1* | 5/2014 | Muthukumar ........... H01Q 3/00 455/411 |

* cited by examiner

METHOD AND APPARATUS FOR CONTROLLING SMART MOBILE DEVICE

CROSS-REFERENCE TO RELATED APPLICATIONS

This application is a U.S. National Stage under 35 U.S.C. § 371 of International Patent Application No. PCT/CN2016/087120, filed on Jun. 24, 2016, which claims priority to Chinese Patent Application No. 201510685061.0, filed on Oct. 20, 2015, the contents of which are incorporated herein by reference in their entirety for all purposes.

TECHNICAL FIELD

The present disclosure relates to, but is not limited to, smart device controlling technologies, and more particularly to a method and apparatus for controlling a smart mobile device.

BACKGROUND

Smart mobile devices have developed in two opposite directions: miniaturization and interface large-sizing. For miniaturized devices such as smart wristbands and smart watches, there is the case where the screen interface is too small or has no interface, which brings inconvenience to the user in operating the device. For large-size mobile phones, such as smart phones or portable android device (PADs) having larger than 5 inches or more, there is the case where the interface is too large and the user's hands are too small so that the interface cannot be handled with one hand, and also it brings inconvenience to the user in operating the device.

Furthermore, there is a case that in the process of driving or eating, people may not be able to release their hands to operate smart mobile devices, or the hands with oil fail to operate smart mobile devices. Or, there is a case that a person with a disabling finger cannot operate a smart mobile device. Or, for some cases, it is inconvenient to operate the smart mobile device with two hands or a single hand, so that it brings inconvenience to the user in using the smart mobile device.

Nowadays, the operation on smart mobile devices, such as gesture recognition and unlocking, mainly include: a mobile phone unlocking scheme and a mobile phone control scheme.

The mobile phone unlocking scheme is generally used to activate the mobile phone interface. The unlocking of the mobile terminal and the smart wearable device is generally realized through a password, a slide to unlock, a long press to unlock, a fingerprint to unlock, a drawing to unlock and the like. The above unlocking method requires the finger to directly touch the screen, but has no way to perform the unlocking based on contact-free operation (i.e., space-free operation). Further, the available subject is mainly limited to a finger or a touch pen, but cannot be unlocked in contact-free way based on other parts of the human body.

The mobile phone control scheme is generally used to control the function of the mobile phone after the mobile phone interface is activated. The mobile phone is manipulated based on a direct touch on resistance screen or a capacitive screen, or an entity button is provided to achieve the corresponding operation. As for the mobile terminal, it is generally manipulated through direct manipulation by fingers, voice operations, and the like. The above operation of the mobile phone is directly performed through physical buttons, or the UI interface button of the mobile phone screen is touched by the finger, but contact-free manipulation cannot be performed.

There is also another method that the structured light is projected to the front surface of the human body through a laser emitter, and an infrared sensor is used to receive the structured light pattern reflected by the human body. Or, the processing chip calculates the spatial information of the human body of the object according to the position and the deformation degree of the received pattern on the camera, that is, the functions such as gesture recognition are provided based on the screen and graphic captures. The above method requires additional use of infrared sensors or cameras, requires a specific lattice model and is also limited to finger manipulation. Still, the functions can also not be operated in contact-free way by other parts of the human body.

SUMMARY

The embodiments of the present disclosure provide a method and an apparatus for controlling a smart mobile device, which can implement control of the smart mobile device in a smart, convenient and rapid manner.

An embodiment of the present disclosure provides a method for controlling a smart mobile device. The method includes: determining, when enabling a control of the smart mobile device by using body induction, a standing wave ratio (SWR) of the smart mobile device on the body induction according to a detected parameter of a body closing to the smart mobile device; and selecting a control instruction according to the determined SWR of the smart mobile device on the body induction and a preset corresponding relationship between the SWR of the smart mobile device on the body induction and the control instruction, and controlling the smart mobile device based on the selected control instruction.

Alternatively, the determining the SWR of the smart mobile device on the body induction includes: collecting parameters of the body closing to the smart mobile device, and selecting a most sensitive collection value based on an antenna position, a frequency point and a body part. The most sensitive collection value is a value with a largest change sensitivity. The method further includes correcting the most sensitive collection value on an original parameter model, and converting the corrected most sensitive collection value into the SWR of the smart mobile device on the body induction at the antenna position.

Alternatively, the method further includes: presetting a corresponding relationship between an SWR of an antenna end of the smart mobile device and an SWR of a radio-frequency (RF) front end of the smart mobile device, before determining when enabling a control of the smart mobile device by using body induction an SWR of the smart mobile device on the body induction according to a detected parameter of a body closing to the smart mobile device.

Then, the determining the SWR of the smart mobile device on the body induction includes: collecting parameters of the body closing to the smart mobile device, and selecting a most sensitive collection value based on an antenna position, a frequency point and a part; and correcting the most sensitive collection value on an original parameter model and converting the corrected most sensitive collection value into the SWR of the RF frond end of the smart mobile device at the antenna position; and determining the SWR of the smart mobile device on the body induction according to the preset corresponding relationship between the SWR of the antenna end of the smart mobile device and the SWR of the RF front end of the smart mobile device.

Alternatively, the method further includes: detecting whether the collection is successful after collecting the parameters of the body closing to the smart mobile device; if the collection is successful and the collected parameters are identifiable, continuing to perform the step of selecting the most sensitive collection value.

Alternatively, the to-be-collected parameters of the body closing to the smart mobile device are set through a user interface; or the to-be-collected parameters of the body closing to the smart mobile device are preset fixed parameters.

Alternatively, the parameters of the body closing to the smart mobile device includes at least one of: a received signal strength indicator (RSSI), a received signal code power (RSCP), a signal-to-noise ratio (SNR), a high power detection (HDET) value, or an antenna reflection coupling circuit parameter, of the smart mobile device.

Alternatively, the determining the SWR of the smart mobile device on the body induction includes one of: determining the SWR according to one of the parameters of the body closing to the smart mobile device; determining, when one of the parameters of the body closing to the smart mobile device is invalid, the SWR according to another one of the parameters of the body closing to the smart mobile device; or determining the SWR according to two or more of the parameters of the body closing to the smart mobile device in a confidence-weighted manner.

Alternatively, the determining the SWR of the smart mobile device on the body induction further includes: selecting a parameter of the body closing to the smart mobile device of which the value is largely changed after the body is close to the smart mobile device according to a detected difference between the body parts to the smart mobile device and the distance between the body parts and the smart mobile device, and determining the SWR by the selected value.

Alternatively, the method further includes: presetting a threshold range. The selecting the control instruction includes: determining a control instruction corresponding to an SWR in the corresponding relationship as the selected control instruction when a difference between the determined SWR of the smart mobile device on the body induction and the SWR in the corresponding relationship is within the preset threshold range.

Alternatively, the controlling the smart mobile device includes: unlocking an interface of the smart mobile device, and operating an application function of the smart mobile device.

The embodiments of the present disclosure further provide an apparatus for controlling a smart mobile device. The apparatus includes a detection module, an acquisition module, a setting storage module, and a control module.

The detection module is configured to detect a parameter of a body closing to the smart mobile device.

The acquisition module is configured to determine an SWR of the smart mobile device on body induction according to the detected parameter of the body closing to the smart mobile device, and output the SWR to the setting storage module or output the SWR to the control module when enabling a control of the smart mobile device by using body induction.

The setting storage module is configured to set a corresponding relationship between the SWR of the smart mobile device on the body induction and a control instruction.

The control module is configured to select the control instruction according to the determined SWR of the smart mobile device on the body induction and the preset corresponding relationship, and control the smart mobile device based on the selected control instruction.

Alternatively, the detection module is configured to collect parameters of the body closing to the smart mobile device, and select a most sensitive collection value based on an antenna position, a frequency point and a body part.

Alternatively, the detection module is further configured to detect whether the collection is successful, and select the most sensitive collection value if the collection is successful and the collected parameters are identifiable.

Alternatively, the acquisition module is configured to correct the most sensitive collection value on an original parameter model and convert the corrected most sensitive collection value into the SWR of the smart mobile device on the body induction at the antenna position.

Alternatively, the acquisition module is configured to correct the most sensitive collection value on an original parameter model and convert the corrected most sensitive collection value into an SWR of a RF frond end of the smart mobile device at the antenna position; and determine the SWR of the smart mobile device on the body induction according to a preset corresponding relationship between an SWR of an antenna end of the smart mobile device and the SWR of the RF front end of the smart mobile device.

Alternatively, the parameters of the body closing to the smart mobile device include at least one of: a received signal strength indicator (RSSI), a received signal code power (RSCP), a signal-to-noise ratio (SNR), a high power detection (HDET) value, or an antenna reflection coupling circuit parameter, of the smart mobile device.

Alternatively, the acquisition module is configured to determine the SWR of the smart mobile device on the body induction by one of the following ways: determining the SWR according to one of the parameters of the body closing to the smart mobile device; determining, when one of the parameters of the body closing to the smart mobile device is invalid, the SWR according to another one of the parameters of the body closing to the smart mobile device; or determining the SWR according to two or more of the parameters of the body closing to the smart mobile device in a confidence-weighted manner.

Alternatively, the acquisition module is further configured to select a parameter of the body closing to the smart mobile device of which the value is largely changed after the body is close to the smart mobile device according to a detected difference between the body parts to the smart mobile device and the distance between the body parts and the smart mobile device, and determine the SWR by the selected value.

Alternatively, the control module is further configured to preset a threshold range; and the control module is configured to determine a control instruction corresponding to an SWR in the corresponding relationship as the selected control instruction when a difference between the determined SWR of the smart mobile device on the body induction and the SWR in the corresponding relationship is within the preset threshold range.

Alternatively, the control module is configured to control the smart mobile device by unlocking an interface of the smart mobile device and operating an application function of the smart mobile device.

Compared with prior art, the technical solution of the present disclosure includes: determining, when enabling a control of the smart mobile device by using body induction, an SWR of the smart mobile device on the body induction according to a detected parameter of a body closing to the smart mobile device; and selecting a control instruction according to the determined SWR of the smart mobile device on the body induction and a preset corresponding relationship between the SWR of the smart mobile device on the body induction and the control instruction, and controlling the smart mobile device based on the selected control instruction. With the technical solutions provided by the embodiments of the present disclosure, the smart mobile device can be controlled in a smart, convenient and rapid manner.

DETAILED DESCRIPTION

Hereinafter, embodiments of the present disclosure will be described in detail with reference to the accompanying drawings.

Due to the need for long-distance calls and data transmission, terminals such as mobile terminals and smart wearable devices may have a multi-mode multi-frequency antenna for cellular communications such as second-generation mobile communications (2G), third-generation mobile communications (3G), and fourth-generation mobile communications (4G). Due to the need for short- and medium-distance data transmission and audio transmission, mobile terminals and smart wearable devices may have Bluetooth as well as Wi-Fi antenna 2.4G/5G Industrial Scientific Medical (ISM) Band antennas. Due to the need for satellite positioning, mobile terminals and smart wearable devices may have antennas for Global Positioning System (GPS), Global Navigation Satellite System (GLONASS), Beidou, Galileo and others. Due to the needs of short-range radio frequency identification and transmission, mobile terminals and smart wearable devices may have Near Field Communication (NFC) low frequency antennas. When these antennas are in free space and close to and in contact with the human body, because of the dielectric value and resistance characteristics of the human body per se, the antenna radiation characteristics would be affected due to the effect of antenna effect of human body in the near magnetic field of the antenna. In other words, the antenna will have a certain degree of induction on the human body, and the distance between different parts of the human body and the mobile terminal and the smart wearable device, motion states, and different antenna types will cause different antenna sensing parameters.

The technical solution provided by the embodiment of the present disclosure is to determine the different controls of the terminal, such as the mobile terminal and the smart wearable device, based on this induction relationship between the antenna and the human body. A multiple standing wave detection function is implemented on the hardware circuit of the original smart mobile device to detect the SWR and reflection coefficient value in the magnetic induction effect at different distances between the human body and the antenna of the smart mobile device, and to detect the varies of the internal receiving strength parameters RSSI, RSCP, and SNR of the smart mobile device signal after the human body is close to the smart mobile device, in order to automatically sense or set the parameters of a body closing to the smart mobile device which are related to the antenna position being close to different bodies or body parts, the distance between the antenna and the human bodies, or a combination thereof. Then, the corresponding relationship between the SWR preset by the smart mobile device and a control instruction is used to identify different operations generated by different inductions on the human body, so as to realize contact-free intelligent manipulation of the smart mobile device.

Figures 1, 2:
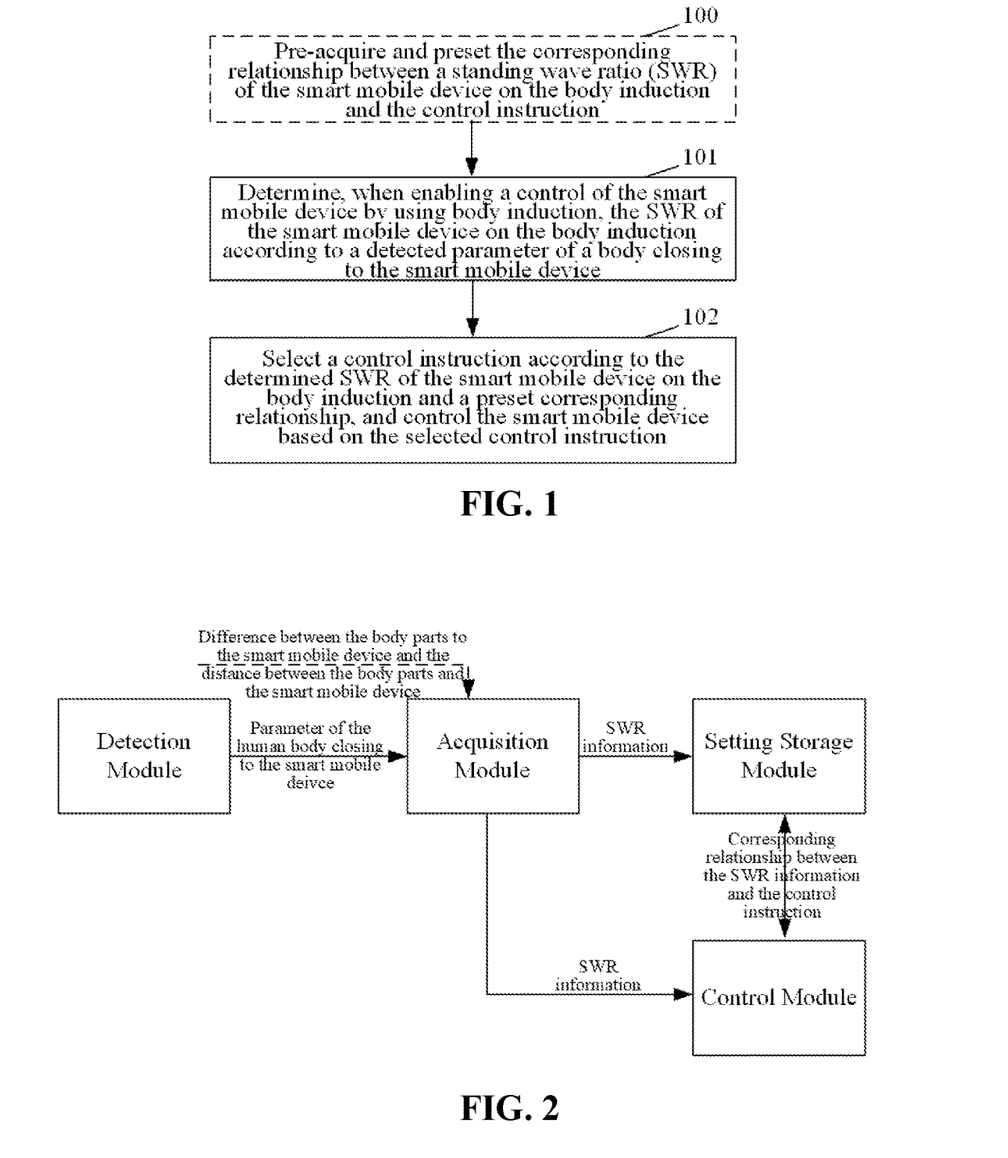
FIG. 1 is a flowchart of a method for controlling a smart mobile device according to an embodiment of the present disclosure.
FIG. 2 is a schematic diagram of the structure of an apparatus for controlling a smart mobile device according to an embodiment of the present disclosure.

FIG. 1 is a flowchart of a method for controlling a smart mobile device according to an embodiment of the present disclosure. As shown in FIG. 1, the method includes the following steps:

Step 101: when enabling a control of the smart mobile device by using body induction, a standing wave ratio (SWR) of the smart mobile device on the body induction is determined according to a detected parameter of a body closing to the smart mobile device.

The SWR of the antenna of the smart mobile device on the body induction represents the square root ratio of a reflected power to an incident power of the antenna.

In this step, the action of the body closing to the smart mobile device may include the body's movement or posture.

In this step, in the process of determining the SWR of the smart mobile device on the body induction, the SWR may be determined based only on one of the parameters of the body closing to the smart mobile device. When this parameter of the body closing to the smart mobile device is invalid, the SWR is determined according to another parameter of the body closing to the smart mobile device. The SWR may also be determined according to two or more of the parameters of the body closing to the smart mobile device in a confidence-weighted manner.

Alternatively, in the process of determining the SWR of the smart mobile device on the body induction, a parameter of the body closing to the smart mobile device of which the value is largely changed after the body is close to the smart mobile device can be selected according to a detected difference between the body parts to the smart mobile device and the distance between the body parts and the smart mobile device, and then the SWR determined based on the selected value.

The determination of the SWR of the antenna of the smart mobile device in this step includes: collecting parameters of the body closing to the smart mobile device, and selecting a most sensitive collection value based on an antenna position, a frequency point and a body part. The most sensitive collection value is a value with a largest change sensitivity; and then correcting the most sensitive collection value on an original parameter model, and converting the corrected most sensitive collection value into the SWR of the smart mobile device on the body induction at the antenna position.

The original parameter model refers to an averaged SWR model on humans, which records the averaged SWR at a preset antenna position, a preset antenna frequency point and a preset body part.

The parameters of the body closing to the smart mobile device includes at least one of: a received signal strength indicator (RSSI), a received signal code power (RSCP), a signal-to-noise ratio (SNR), a high power detection (HDET) value, or an antenna reflection coupling circuit parameter, of the smart mobile device.

The SWR of the antenna (or the voltage standing wave ratio of the antenna) represents the square root ratio of the reflected power to the incident power of the antenna. During the transmission of wireless signals, due to the influence of space media and impedance circuits, there may be a reflection on the signal, which affects the antenna's receiving performance. If there is no reflection in an antenna, the SWR should be 1. If the SWR of the antenna is in the range of 1.1 to 1.5, then the signal reflection is considered to be small. In this case, the intensity of the wireless signal received by the smart mobile device will be high. If the SWR of the antenna is greater than 1.5, it means that the reflection is large and hence majority of the received power will be reflected or attenuated. In this case, the intensity of the wireless signal received by the smart mobile device will be low. Therefore, through the RSSI, RSCP, SNR and other built-in parameters of the smart mobile device, i.e., the parameter of a body closing to the smart mobile device, the standing wave value (or reflectivity change) of the antenna of the smart mobile device after being induced by the human body can be indirectly obtained, thereby realizing the control of the smart mobile device based on the body induction.

The SWR of the antenna of the smart mobile device is difficult to be directly collected. In this way, it is possible to directly collect the SWR of the RF front end, and collect the RF impedance line between the SWR of the antenna and the SWR of the RF front end can be to include the system loss value together with the punching matching, and their relationship value is calculated in advance, and converted into corresponding curves or numerical tables stored in the smart mobile device; and then the corresponding relationship between the SWRs of the antenna and RF front end is used. In this way, when the SWR of the RF front end is determined, the SWR at the antenna end affected by body induction can be determined.

Before this step, the method further includes: presetting the corresponding relationship between the SWR of the antenna end and the SWR of the RF front end of the smart mobile device.

In this way, the determination of the SWR of the smart mobile device on the body induction in this step includes:

collecting parameters of the body closing to the smart mobile device, and selecting a most sensitive collection value based on an antenna position, a frequency point and a body part, and then correcting the most sensitive collection value on an original parameter model, and converting the corrected most sensitive collection value into the SWR of the RF front end of the smart mobile device at the antenna position; and then the SWR of the smart mobile device on the body induction at the antenna position can be determined according to the preset corresponding relationship between the SWR of the antenna end and the SWR of the radio frequency front end of the smart mobile device.

It should be noted that this method of converting the SWR of the RF front end of the smart mobile device to the SWR of the antenna is suitable for a case where the RF front end insertion loss is relatively small. The closer the loss is to 0, the closer the SWR of the RF front end or chip end is to the SWR of the antenna of the smart mobile device, and the higher the test accuracy is. Therefore, in an actual collection, an antenna with a small system insertion loss can be selected as a collection antenna.

In the specific implementation, a coupling circuit and a detection circuit can be worked together with the RF front end circuit of the smart mobile device. The coupling circuit and the sampling circuit collect the amplitude and phase change of the transmitting circuit after the antenna load is applied. The coupling circuit is divided into two parts: a forward coupling circuit and a reverse coupling circuit. The forward coupling current is a smart mobile device with a coupler. The 50-ohm ground-feedback circuit is configured to collect an emitted signal of the smart mobile device as an incident signal. The reverse coupling circuit may be disposed following the frequency divider or switch of the RF front-end circuit, or may be disposed directly followed by the matching circuit of the antenna of the smart mobile device, and is configured to collect the reflected signal transmitted by the smart mobile device or the incident signal received by the antenna. The coupler used herein is a wideband coupler that can cover the entire antenna frequency band. In order to improve the feedback collection accuracy, an isolator can be added between the forward coupling circuit and the reverse coupling circuit in order to prevent the leakage between the incident signal and the reflected signal. Also, the narrow band High-Q filter may be provided to filter out other frequency signals from the outside or the harmonics of the emitted signal. The filtered forward and reverse sampling signals pass through a detection circuit unit, a differential amplification circuit and a mixing circuit to obtain the corresponding amplitude and phase signals. After the diode is converted into a digital signal, it is input to the baseband chip of the smart mobile device and further converted to a corresponding SWR or reflection coefficient value. It should be noted that based on the foregoing description of the principle disclosed in the embodiments of the present disclosure, it is easy for those skilled in the art to adopt different circuit forms to achieve the collection of the SWR of the antenna. It is not used to limit the protection scope of the present disclosure, and it will not be repeated here.

The standing wave detection can also be indirectly detected by using a variable capacitor connected in parallel or in series on the antenna matching circuit. The mobile phone collects the power value of the incident end of the smart mobile device when the human body is not close to the antenna, and then collects the changed variable capacitance when the human body is close to the antenna, and the value is matched to the power value of the incident end when the human body is not close to the antenna. The two power values can be converted based on the digital-to-analog conversion and then input to the mobile phone baseband chip to make the comparison. The difference between the variable capacitance and the changed variable capacitance is calculated and converted into an interpolation table corresponding to the SWR. Then, the state and interpolation are detected after the different bodies are close to the mobile phone, so as to realize the control of the corresponding mobile phone instruction.

When the human body is close to the smart mobile device with the HDET value, the specific implementation includes:

The baseband chip of the smart mobile device acquires both the high power detector (HDET) values fed back by the forward and reverse coupler, and indirectly maps the SWR value based on the difference in HDET values. For example, at the same signal strength and level, when the smart mobile device receives the same signal, the HDET1 value obtained by the reflected signal is 1250. If the HDET2 value of the incident signal is also approximately the 1250 value, it indicates that the signal is little reflected, so that the signal conversion power is very strong and hence the corresponding SWR is closer to 1. If the detected HDET2 value of the incident signal is 2000, it indicates that the signal between the smart mobile device and the base station is weak, so that it needs to compensate for the higher transmission power to achieve the same signal strength. In this way, the corresponding SWR will be far away from 1, for example 2. That is, when the corresponding part of the human body is close to the antenna corresponding to the smart mobile device, the corresponding SWR can be obtained by searching the corresponding mapping storage table based on the collection of the HDET value, so as to find the corresponding control instruction for controlling the smart mobile device.

Alternatively, the method further includes: detecting whether the collection is successful; if the collection is successful and identifiable, the step of selecting the most sensitive collection value may continue to be performed; if the collection is failed, the re-collection may be prompted. If the collected value is valid, that is, is within the range of the detectable range, or is close to the original parameter model value, then the collection is considered to be successful.

The embodiment of the present disclosure also includes: before Step 101,

Step 100: the corresponding relationship between the SWR of the smart mobile device on the body induction and the control instruction is pre-acquired and preset.

The SWR of the antenna of the smart mobile device on the body induction represents the square root ratio of the reflected power to the incident power of the antenna.

In this step, the corresponding relationship between the acquired SWR of the antenna of the smart mobile device and the control instruction may be set through a preset user interface.

The acquisition on the SWR of the smart mobile device on the body induction in this step is consistent with the specific implementation of determining the SWR of the smart mobile device on the body induction in step 101, and also includes: collecting parameters of the body closing to the smart mobile device, and selecting a most sensitive collection value based on an antenna position, a frequency point and a body part. The most sensitive collection value is a value with a largest change sensitivity; and then correcting the most sensitive collection value on an original parameter model, and converting the corrected most sensitive collection value into the SWR of the smart mobile device on the body induction at the antenna position. The specific implementation will not be repeated here.

In this step, the smart mobile device collects the SWR of the smart mobile device on the human induction based on the collection of the change of parameters caused by the human body being close to the smart mobile device to obtain the corresponding SWR of the smart mobile device on the human induction, and set different control instructions corresponding to different SWRs. In this way, in the subsequent use of the smart mobile device, it is possible to use the induction relationship between the antenna and the human body to determine different controls on the smart mobile device such as the mobile terminal and the smart wearable device.

Step 102: a control instruction is selected according to the determined SWR of the smart mobile device on the body induction and a preset corresponding relationship, and the smart mobile device is controlled based on the selected control instruction.

Controlling the smart mobile device includes: unlocking an interface of the smart mobile device and operating the application function of the smart mobile device.

Alternatively, because there will be errors in the test process, the SWR obtained by the test and the SWR in the corresponding relationship stored in the smart mobile device will have certain differences. Therefore, in searching the corresponding relationship, the determined SWR of the smart mobile device on the body induction is valid as long as the different between the determined SWR of the smart mobile device on the body induction and the SWR in the corresponding relationship is within the preset threshold range.

The method of the present disclosure will be described in detail below in combination with several embodiments.

The SWRs of mobile phone antennas in different frequency bands are different. For example, for mobile phones on Global System for Mobile Communications (GSM), Wideband Code Division Multiple Access (WCDMA), Long Term Evolution (LTE), Wireless Local Area Network (WIFI), BT, and Near Field Coupled (NFC) antennas have different antenna frequencies and different wavelengths. That is, the SWR values formed by the body induction will also have some differences. After the SWR of each antenna is acquired through collection, a sensitive and widely-differentiated frequency band would be selected as the identification frequency band, that is, the SWR corresponding to the antenna is acquired or tested by the different locations and regions of the mobile phone antenna on the body induction. For example, at the same distance, the SWR of the LTE PRX antenna located at the lower left of the smart mobile device relative to the human hand is 0.6, and the SWR of the CDMA PRX antenna located at the lower right corner of the smart mobile device relative to the human hand is 1.1. In this way, it is possible to use this difference to achieve different controls of smart mobile devices.

Since the SWR is very sensitive to the relative distance, when the relative distance between the human body and the mobile phone antenna changes, the SWR will change proportionally. For example: with the distance having 1 cm, 3 cm, 5 cm, 10 cm and 15 cm from the human body, the larger the distance is, the smaller the SWR is. Even though it is not changed in linear relationship, there will still be an order of magnitude change. When the human body has a certain distance with the corresponding antenna of the mobile phone, the standing wave diagram of the same frequency point at different distances would change. Different human-machine distances will cause a significantly change in the SWR. The SWR can represent the reflection coefficient of the antenna. Different standing man-machine distances from 0 to 15 CM in different antenna frequency points are different.

When the different parts of the human body are close to the antenna of the mobile phone at different angles, the standing wave diagram changes or the standing wave frequency shifts. When the human body approaches the working antenna of the mobile phone, the original single or multiple resonant standing wave points will have peak shifts or peak changes due to the influence of the body induction. At this time, the relative positional change between the human body and the mobile phone will also have a certain influence on the SWR of the antenna. For example, when the human hand is above, below, or to the left or right of the corresponding antenna of the mobile phone, or when the antenna is at a certain angle with the human hand, the reflection coefficient or the SWR will be significantly changed. Therefore, different controls of the smart mobile device can be achieved through different orientations of the body parts. By setting different induction angles, different inductive manipulation with different angles can be achieved. For example, a vertical, horizontal, 45 degrees, 30 degrees, etc positional relationship between the palm and the phone can be configured, and then the collected corresponding parameter values and preset values are compared, so that different controls of the smart mobile device can be realized based on inductions of the smart mobile device to the human body on different orientations and angles.

An embodiment of the present disclosure further provides a computer storage medium storing computer-executable instructions therein. The computer-executable instructions are used to execute the foregoing method.

FIG. 2 is a schematic diagram of the structure of an apparatus for controlling a smart mobile device according to an embodiment of the present disclosure. As shown in FIG. 2, the apparatus includes a detection module, an acquisition module, a setting storage module, and a control module.

The detection module is configured to detect a parameter of a body closing to the smart mobile device;

The acquisition module is configured to determine an SWR of the smart mobile device on body induction according to the detected parameter of the body closing to the smart mobile device and output the SWR to the setting storage module, or output the SWR to the control module when enabling a control of the smart mobile device by using body induction.

The setting storage module is configured to set a corresponding relationship between the SWR of the smart mobile device on the body induction and a control instruction.

The control module is configured to select the control instruction according to the determined SWR of the smart mobile device on the body induction and a preset corresponding relationship, and control the smart mobile device based on the selected control instruction.

The detection module is configured to collect parameters of the body closing to the smart mobile device, and select a most sensitive collection value based on an antenna position, a frequency point and a body part. The detection module is further configured to detect whether the collection is successful; if the collection is successful and identifiable, it may enter the mode of controlling the smart mobile device by using the body induction, and if the collection is failed, re-collection is prompted.

The acquisition module is configured to correct the most sensitive collection value on an original parameter model and convert the corrected most sensitive collection value into SWR of the smart mobile device on the body induction at the antenna position.

Alternatively, the corresponding relationship between the SWR of the antenna end and the SWR of the RF front end of the smart mobile device is preset, and the acquisition module is configured to correct the most sensitive collection value on an original parameter model and convert the corrected most sensitive collection value into the SWR of the RF frond end of the smart mobile device at the antenna position; and determine the SWR of the smart mobile device on the body induction according to the preset corresponding relationship between the SWR of the antenna end of the smart mobile device and the SWR of the RF front end of the smart mobile device.

The parameters of the body closing to the smart mobile device include at least one of: a received signal strength indicator (RSSI), a received signal code power (RSCP), a signal-to-noise ratio (SNR), a high power detection (HDET) value, or an antenna reflection coupling circuit parameter, of the smart mobile device.

Alternatively, the acquisition module is configured to determine the SWR of the smart mobile device on the body induction based on one of: determination on the SWR according to one of the parameters of the body closing to the smart mobile device; determination on, when one of the parameters of the body closing to the smart mobile device is invalid, the SWR according to another one of the parameters of the body closing to the smart mobile device; and determination on the SWR according to two or more of the parameters of the body closing to the smart mobile device in a confidence-weighted manner.

Alternatively, the acquisition module is further configured to select a parameter of the body closing to the smart mobile device of which the value is largely changed after the body is close to the smart mobile device according to a detected difference between the body parts to the smart mobile device and the distance between the body parts and the smart mobile device, and determine the SWR by the selected value.

Alternatively, the control module is further configured to preset a threshold range. Alternatively, the control module is configured to determine a control instruction corresponding to an SWR in the corresponding relationship as the selected control instruction when a difference between the determined SWR of the smart mobile device on the body induction and the SWR in the corresponding relationship is within the preset threshold range.

Alternatively, the control module is configured to control the smart mobile device by unlocking an interface of the smart mobile device and operating an application function of the smart mobile device.

Those of ordinary skill in the art can understand that all or part of the steps in the above method can be realized by a program to instruct related hardware (e.g., a processor), and the program can be stored in a computer-readable storage medium, such as a read-only memory, a magnetic disk, or a compact disk, etc. Alternatively, all or some of the steps of the above embodiments may also be implemented using one or more integrated circuits. Accordingly, each module/unit in the above embodiments may be implemented in the form of hardware, such as by an integrated circuit to achieve its corresponding function, or may be implemented in the form of a software function module, for example, by executing program/instruction stored in a memory by a processor to achieve its corresponding function. The disclosure is not limited to any specific form of hardware and software combination.

The above description is merely examples of the present disclosure and is not intended to limit the protection scope of the present disclosure. Any modification, equivalent replacement, and improvement made within the spirit and principle of the present disclosure shall fall within the protection scope of the present disclosure.

INDUSTRIAL APPLICABILITY

With the above technical solution, the smart mobile device can be controlled in a smart, convenient and rapid manner.

What is claimed is:

1. A method for controlling a smart mobile device, comprising:
   determining, when enabling a control of the smart mobile device by using body induction, a standing wave ratio (SWR) of the smart mobile device on the body induction according to a detected parameter of a body moving towards the smart mobile device; and
   selecting a control instruction according to the determined SWR of the smart mobile device on the body induction and a preset corresponding relationship between the SWR of the smart mobile device on the body induction and the control instruction, and controlling the smart mobile device based on the selected control instruction to at least one of: unlock an interface of the smart mobile device or operate an application function of the smart mobile device.

2. The method according to claim 1, wherein the determining the SWR of the smart mobile device on the body induction comprises:
collecting parameters of the body moving towards the smart mobile device, and selecting a most sensitive collection value based on an antenna position, a frequency point and a body part, wherein the most sensitive collection value is a value with a largest change sensitivity;
correcting the most sensitive collection value on an original parameter model, and converting the corrected most sensitive collection value into the SWR of the smart mobile device on the body induction at the antenna position.

3. The method according to claim 1, further comprising:
presetting a corresponding relationship between an SWR of an antenna end of the smart mobile device and an SWR of a radio-frequency (RF) front end of the smart mobile device, before determining when enabling a control of the smart mobile device by using body induction an SWR of the smart mobile device on the body induction according to a detected parameter of a body moving towards the smart mobile device,
wherein the determining the SWR of the smart mobile device on the body induction comprises:
collecting parameters of the body moving towards the smart mobile device, and selecting a most sensitive collection value based on an antenna position, a frequency point and a body part;
correcting the most sensitive collection value on an original parameter model and converting the corrected most sensitive collection value into the SWR of the RF frond end of the smart mobile device at the antenna position; and determining the SWR of the smart mobile device on the body induction according to the preset corresponding relationship between the SWR of the antenna end of the smart mobile device and the SWR of the RF front end of the smart mobile device.

4. The method according to claim 2, further comprising:
detecting whether the collection is successful after collecting the parameters of the body moving towards the smart mobile device;
if the collection is successful and the collected parameters are identifiable, continuing to perform the step of selecting the most sensitive collection value.

5. The method according to claim 1, wherein the to-be-collected parameters of the body moving towards the smart mobile device are set through a user interface; or the to-be-collected parameters of the body moving towards the smart mobile device are preset fixed parameters.

6. The method according to claim 1, wherein the parameters of the body moving towards the smart mobile device comprise at least one of: a received signal strength indicator (RSSI), a received signal code power (RSCP), a signal-to-noise ratio (SNR), a high power detection (HDET) value, or an antenna reflection coupling circuit parameter, of the smart mobile device.

7. The method according to claim 6, wherein the determining the SWR of the smart mobile device on the body induction comprises one of:
determining the SWR according to one of the parameters of the body moving towards the smart mobile device;
determining, when one of the parameters of the body moving towards the smart mobile device is invalid, the SWR according to another one of the parameters of the body moving towards the smart mobile device; or
determining the SWR according to two or more of the parameters of the body moving towards the smart mobile device in a confidence-weighted manner.

8. The method according to claim 7, wherein the determining the SWR of the smart mobile device on the body induction further comprises:
selecting a parameter of the body moving towards the smart mobile device of which the value is largely changed after the body is close to the smart mobile device according to a detected difference between the body parts to the smart mobile device and the distance between the body parts and the smart mobile device, and determining the SWR by the selected value.

9. The method according to claim 1, further comprising:
presetting a threshold range;
wherein the selecting the control instruction comprises:
determining a control instruction corresponding to an SWR in the corresponding relationship as the selected control instruction when a difference between the determined SWR of the smart mobile device on the body induction and the SWR in the corresponding relationship is within the preset threshold range.

10. An apparatus for controlling a smart mobile device, comprising a detection module, an acquisition module, a setting storage module and a control module, wherein
the detection module is configured to detect a parameter of a body moving towards the smart mobile device;
the acquisition module is configured to determine a standing wave ratio (SWR) of the smart mobile device on body induction according to the detected parameter of the body moving towards the smart mobile device, and output the SWR to the setting storage module or output the SWR to the control module when enabling a control of the smart mobile device by using body induction;
the setting storage module is configured to set a corresponding relationship between the SWR of the smart mobile device on the body induction and a control instruction; and
the control module is configured to select the control instruction according to the determined SWR of the smart mobile device on the body induction and the preset corresponding relationship, and control the smart mobile device based on the selected control instruction to at least one of: unlock an interface of the smart mobile device or operate an application function of the smart mobile device.

11. The apparatus according to claim 10, wherein the detection module is configured to collect parameters of the body moving towards the smart mobile device, and select a most sensitive collection value based on an antenna position, a frequency point and a body part.

12. The apparatus according to claim 11, wherein the detection module is further configured to detect whether the collection is successful, and select the most sensitive collection value if the collection is successful and the collected parameters are identifiable.

13. The apparatus according to claim 11, wherein
the acquisition module is configured to correct the most sensitive collection value on an original parameter model and convert the corrected most sensitive collection value into the SWR of the smart mobile device on the body induction at the antenna position; or the acquisition module is configured to correct the most sensitive collection value on an original parameter model and convert the corrected most sensitive collection value into an SWR of a RF frond end of the smart mobile device at the antenna position; and determine the SWR of the smart mobile device on the body induction according to a preset corresponding relationship between an SWR of an antenna end of the smart mobile device and the SWR of the RF front end of the smart mobile device.

14. The apparatus according to claim 10, wherein the parameters of the body moving towards the smart mobile device comprise at least one of: a received signal strength indicator (RSSI), a received signal code power (RSCP), a signal-to-noise ratio (SNR), a high power detection (HDET) value, or an antenna reflection coupling circuit parameter, of the smart mobile device.

15. The apparatus according to claim 14, wherein the acquisition module is configured to determine the SWR of the smart mobile device on the body induction by one of the following ways:
   determining the SWR according to one of the parameters of the body moving towards the smart mobile device;
   determining, when one of the parameters of the body moving towards the smart mobile device is invalid, the SWR according to another one of the parameters of the body moving towards the smart mobile device; or
   determining the SWR according to two or more of the parameters of the body moving towards the smart mobile device in a confidence-weighted manner.

16. The apparatus according to claim 15, wherein the acquisition module is further configured to select a parameter of the body moving towards the smart mobile device of which the value is largely changed after the body is close to the smart mobile device according to a detected difference between the body parts to the smart mobile device and the distance between the body parts and the smart mobile device, and determine the SWR by the selected value.

17. The apparatus according to claim 10, wherein the control module is further configured to preset a threshold range; and
   wherein the control module is configured to determine a control instruction corresponding to an SWR in the corresponding relationship as the selected control instruction when a difference between the determined SWR of the smart mobile device on the body induction and the SWR in the corresponding relationship is within the preset threshold range.

18. A non-transitory computer-readable storage medium, storing computer-executable instructions, which, when executed by a processor, causes the processor to implement the method according to claim 1.

* * * * *